(12) United States Patent
Uchida (10) Patent No.: US 8,960,715 B2
(45) Date of Patent: Feb. 24, 2015

(54) HEAD PROTECTION DEVICE AND GUIDING BRACKET

(71) Applicant: Toyota Boshoku Kabushiki Kaisha, Aichi-ken (JP)

(72) Inventor: Yasunori Uchida, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 14/043,204

(22) Filed: Oct. 1, 2013

(65) Prior Publication Data

US 2014/0110922 A1  Apr. 24, 2014

(30) Foreign Application Priority Data

Oct. 23, 2012 (JP) .................................. 2012-234191

(51) Int. Cl.
| | | |
|---|---|---|
| *B60R 21/213* | (2011.01) | |
| *B60R 21/232* | (2011.01) | |
| *B60R 21/214* | (2011.01) | |
| *B60R 21/00* | (2006.01) | |
| *B60R 21/16* | (2006.01) | |
| *B60R 21/04* | (2006.01) | |
| *B60R 13/02* | (2006.01) | |

(52) U.S. Cl.
CPC ............. *B60R 21/213* (2013.01); *B60R 21/214* (2013.01); *B60R 2021/0006* (2013.01); *B60R 2021/0048* (2013.01); *B60R 2021/161* (2013.01); *B60R 2021/0442* (2013.01); *B60R 2021/0435* (2013.01); *B60R 2021/0414* (2013.01); *B60R 2013/0287* (2013.01); *B60R 21/232* (2013.01); *B60R 13/0212* (2013.01)
USPC ....................................... 280/730.2; 280/748

(58) Field of Classification Search
CPC .. B60R 21/213; B60R 21/214; B60R 21/232; B60R 21/23138; B60R 2021/161; B60R 2021/0414; B60R 2021/0435; B60R 2021/0442; B60R 2021/0006; B60R 2021/0048; B60R 2013/0287
USPC ............................. 280/728.2, 730.2, 751, 748
See application file for complete search history.

(56) References Cited

U.S. PATENT DOCUMENTS

| | | | | |
|---|---|---|---|---|
| 6,217,061 | B1 * | 4/2001 | Harland et al. | ............ 280/730.2 |
| 6,530,594 | B1 * | 3/2003 | Nakajima et al. | ........... 280/730.2 |
| 7,322,601 | B2 * | 1/2008 | Bertossi | ..................... 280/730.2 |

FOREIGN PATENT DOCUMENTS

| | | |
|---|---|---|
| JP | 2006-175920 | 7/2006 |
| JP | 2009113809 A * | 5/2009 |

OTHER PUBLICATIONS

U.S. Appl. No. 14/043,227 to Yasunori Uchida, which was filed Oct. 1, 2013.

* cited by examiner

*Primary Examiner* — Keith Frisby
(74) *Attorney, Agent, or Firm* — Greenblum & Bernstein, P.L.C.

(57) ABSTRACT

A head protection device includes an air bag and a guiding bracket, and the guiding bracket includes an attachment surface that has an attachment portion attached to a body panel, a guiding wall that has a support portion for supporting the air bag, and a contact portion that is coupled to an end of the guiding wall in the vehicle cabin side and contacts a ceiling material. A weak portion deformed toward the vehicle cabin outer side by a load of a passenger's head at a collision causing no activation of an inflator is formed between the support portion of the guiding wall and the contact portion.

6 Claims, 8 Drawing Sheets

HEAD PROTECTION DEVICE AND GUIDING BRACKET

CROSS-REFERENCE TO RELATED APPLICATIONS

The present application claims priority under 35 U.S.C. §119 of Japanese Application No. 2012-234191 filed on Oct. 23, 2012, the disclosure of which is expressly incorporated by reference herein in its entirety.

BACKGROUND OF THE INVENTION

1. Field of the Invention

The present invention relates to a head protection device and a guiding bracket, and in particular, to a head protection device and a guiding bracket that can smoothly guide an air bag to the vehicle cabin side while bearing a load caused by inflation of the air bag at expansion of the air bag, and can absorb a load of a passenger's head at small collision such that an inflator is not activated.

2. Description of the Related Art

Figure 9:
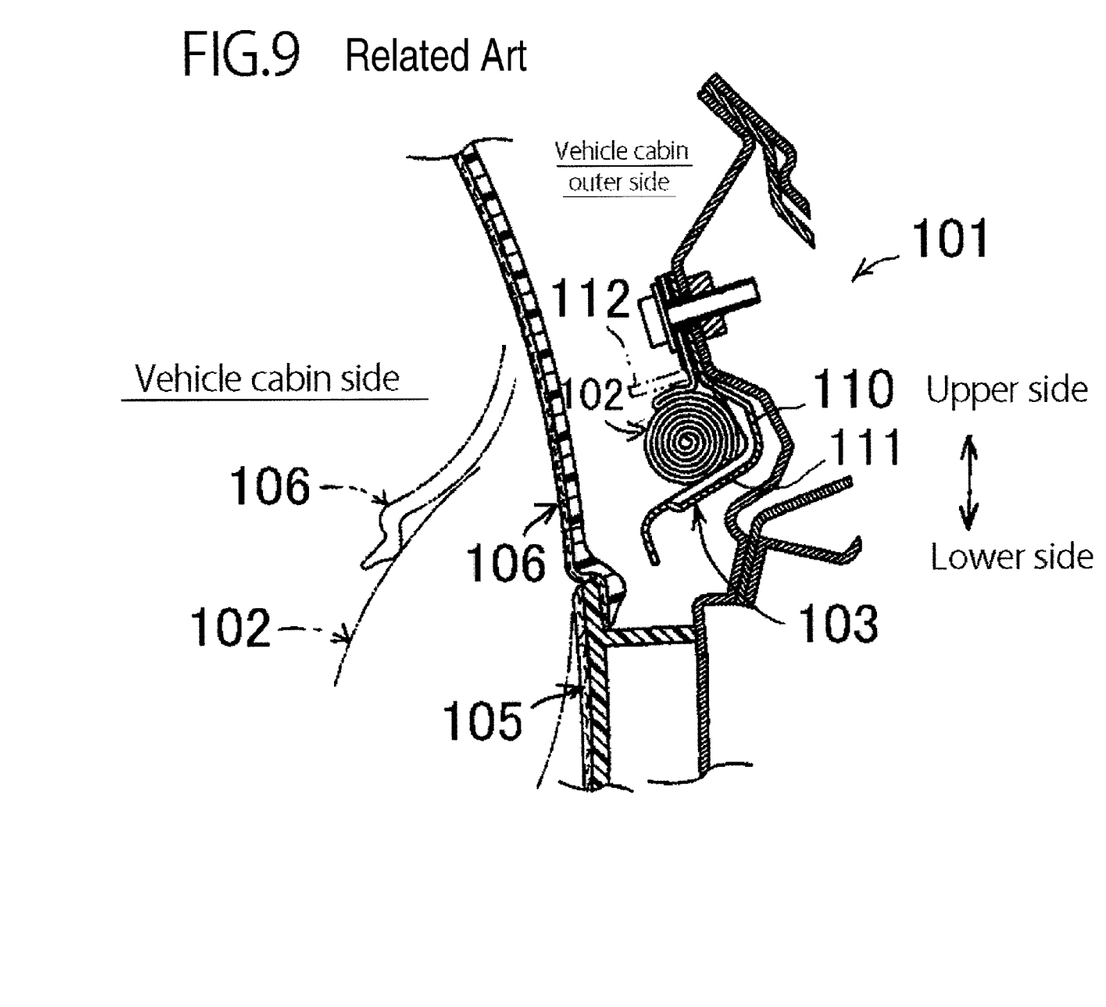
FIG. 9 is an explanatory view showing a conventional head protection device.

A conventionally known head protection device includes an air bag and a guiding bracket (Refer to, for example, Japanese Unexamined Patent Publication No. 2006-175920). For example, as shown in FIG. 9, the patent document discloses a head protection device 101 including an air bag 102 that presses a ceiling material 106 from between a pillar 105 and the ceiling material 106 to open the ceiling material 106, and expands and inflates downward when an inflator is activated to flow a gas into the airbag 102, and a metal guiding bracket 103 that guides the air bag 102 expanded and inflated by the inflator to the vehicle cabin side. The guiding bracket 103 includes upper and lower guiding walls 111 and 112 that store the air bag 102 and a coupling wall 110 that couples ends of the guiding walls 111 and 112 to each other, and has a substantially U-shape in a vertical section.

According to the technique disclosed in the patent document, at expansion of the air bag 102, the guiding wall 111 having one free end can smoothly guide the air bag 102 to the vehicle cabin side while bearing the load caused by expansion of the air bag 102. However, at small collision such that the inflator is not activated, the guiding wall 111 cannot absorb a load of the passenger's head, if any.

SUMMARY OF THE INVENTION

In consideration of the current circumstances, an object of the present invention is to provide a head protection device and a guiding bracket that can smoothly guide an air bag to the vehicle cabin side while bearing a load caused by inflation of the air bag at expansion of the air bag, and can absorb a load of a passenger's head at a small collision causing no activation of an inflator.

One aspect of the present embodiments provides a head protection device comprising: an air bag covered with a ceiling material arranged above a pillar of a vehicle, the air bag pressing the ceiling material from between the pillar and the ceiling material to open the ceiling material and expanding and inflating downward when an inflator is activated to flow a gas into the air bag; and a guiding bracket covered with the ceiling material above the pillar, the guiding bracket guiding the air bag expanded and inflated by the inflator to a vehicle cabin side, wherein the guiding bracket includes: an attachment surface extending along a body panel in a vehicle vertical direction, and the attachment surface having an attachment portion attached to the body panel; a guiding wall extending from a lower end of the attachment surface toward the vehicle cabin side, the guiding wall having a support portion for supporting the air bag; and a contact portion coupled to an end of the guiding wall in the vehicle cabin side, the contact portion contacting the ceiling material, and a weak portion deformed toward a vehicle cabin outer side by a load of a passenger's head at a collision causing no activation of the inflator is formed between the support portion of the guiding wall and the contact portion.

In a further aspect, the weak portion is formed near the contact portion of the guiding wall along the longitudinal direction of the vehicle.

In a further aspect, a back surface of the guiding wall has ribs in contact with the body panel at respective ends of the weak portion in the longitudinal direction of the vehicle.

In a further aspect, the weak portion is formed of a through hole provided along the longitudinal direction of the vehicle, and an edge of an upper surface of the through hole on the vehicle cabin side has an inclined surface inclined toward the back surface of the guiding wall.

One aspect of the present embodiments provides a guiding bracket that is covered with a ceiling material above a pillar of a vehicle, and guides an air bag expanded and inflated by an inflator to a vehicle cabin side, the guiding bracket including: an attachment surface having an attachment portion attached to a body panel; a guiding wall extending from a lower end of the attachment surface in a predetermined direction, the guiding wall having a support portion for supporting the air bag; and a contact portion coupled to a front end of the guiding wall, the contact portion contacting the ceiling material, wherein a weak portion deformed toward a vehicle cabin outer side by a load of a passenger's head at a collision causing no activation of the inflator is formed between the support portion of the guiding wall and the contact portion.

According to the head protection device in this embodiment, the guiding bracket includes the attachment surface that extends along the body panel in the vehicle vertical direction and has the attachment portion attached to the body panel, the guiding wall that extends from the lower end of the attachment surface toward the vehicle cabin side and has the support portion for supporting the air bag, and the contact portion that is coupled to the end of the guiding wall the vehicle cabin side and contacts the ceiling material. The weak portion deformed toward the vehicle cabin outer side by the load of the passenger's head at a collision causing no activation of the inflator is formed between the support portion of the guiding wall and the contact portion. Thus, at expansion of the air bag, the guiding wall can smoothly guide the air bag to the vehicle cabin side while bearing the load caused by inflation of the air bag. At a small collision causing no activation of the inflator, the weak portion is deformed toward the vehicle cabin outer side by the load from the vehicle cabin side, absorbing the load of the passenger's head.

In the case where the weak portion is formed near the contact portion of the guiding wall along the longitudinal direction of the vehicle, a distance between the weak portion and the stored air bag supported by the support portion is large, further suppressing the effect of the air bag on the weak portion at expansion of the air bag. Further, the weak portion can absorb the load more reliably.

In the case where the back surface of the guiding wall has the ribs in contact with the body panel at respective ends of the weak portion in the longitudinal direction of the vehicle, at expansion of the air bag, the guiding wall is supported by the body panel with the ribs, and at a small collision causing no activation of the inflator, the weak portion is deformed using the ribs as bases.

In the case where the weak portion is formed of the through hole provided along the longitudinal direction of the vehicle, and the edge of the upper surface of the through hole in the vehicle cabin side has the inclined surface inclined toward the back surface of the guiding wall, at expansion of the air bag, it is prevented that the air bag caught with the through hole, and also prevented that the airbag is inhibited from expanding. Further, the weak portion can absorb the load more reliably.

The guiding bracket in this embodiment includes the attachment surface that has the attachment portion attached to the body panel, the guiding wall that extends from the lower end of the attachment surface in the predetermined direction and has the support portion for supporting the air bag, and the contact portion that is coupled to the front end of the guiding wall and contacts the ceiling material. The weak portion deformed toward the vehicle cabin outer side by the load of the passenger's head at a collision causing no activation of the inflator is formed between the support portion of the guiding wall and the contact portion. Thus, at expansion of the air bag, the guiding wall can guide the air bag to the vehicle cabin side while bearing the load caused by inflation of the air bag. Further, at a small collision causing no activation of the inflator, the weak portion is deformed toward the vehicle cabin outer side by the load from the vehicle cabin side, absorbing the load of the passenger's head.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DESCRIPTION OF THE PREFERRED EMBODIMENT

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
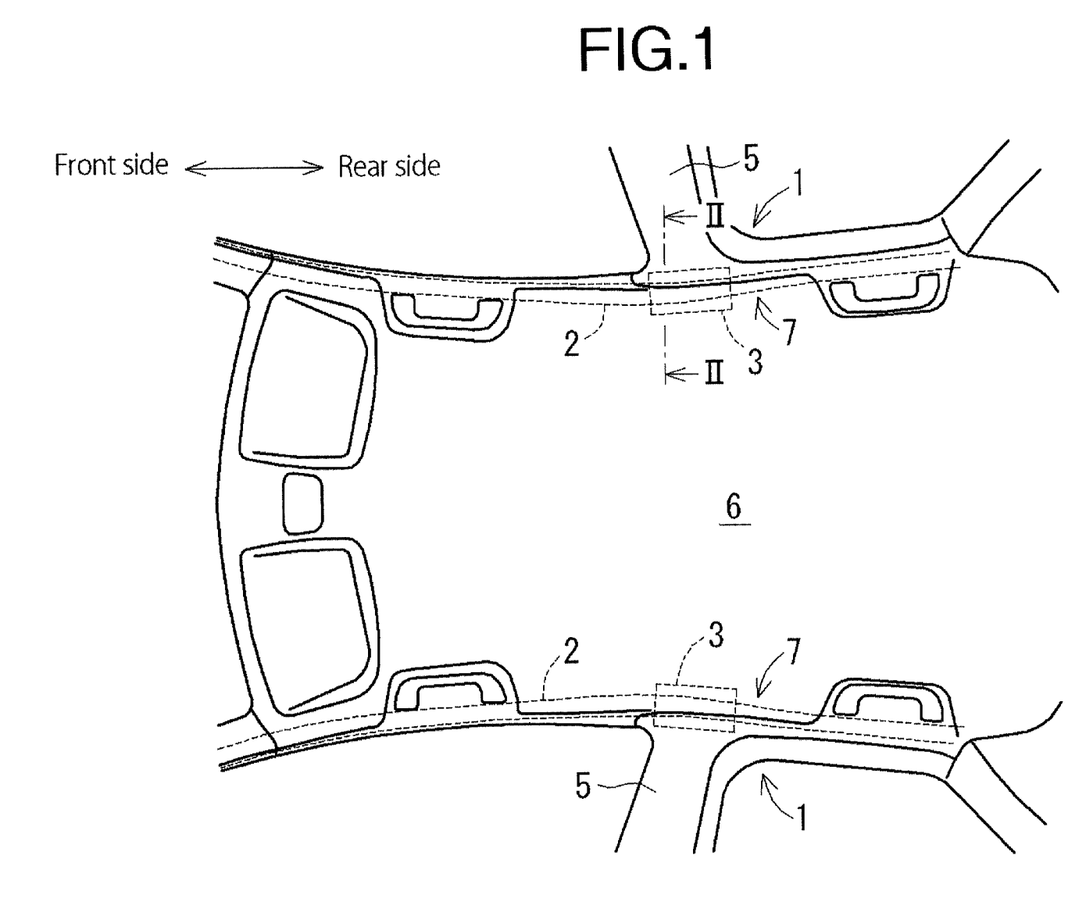
FIG. 1 is a schematic view of a ceiling of a vehicle having a head protection device in a working example when viewed from a vehicle cabin side.
Figure 2:
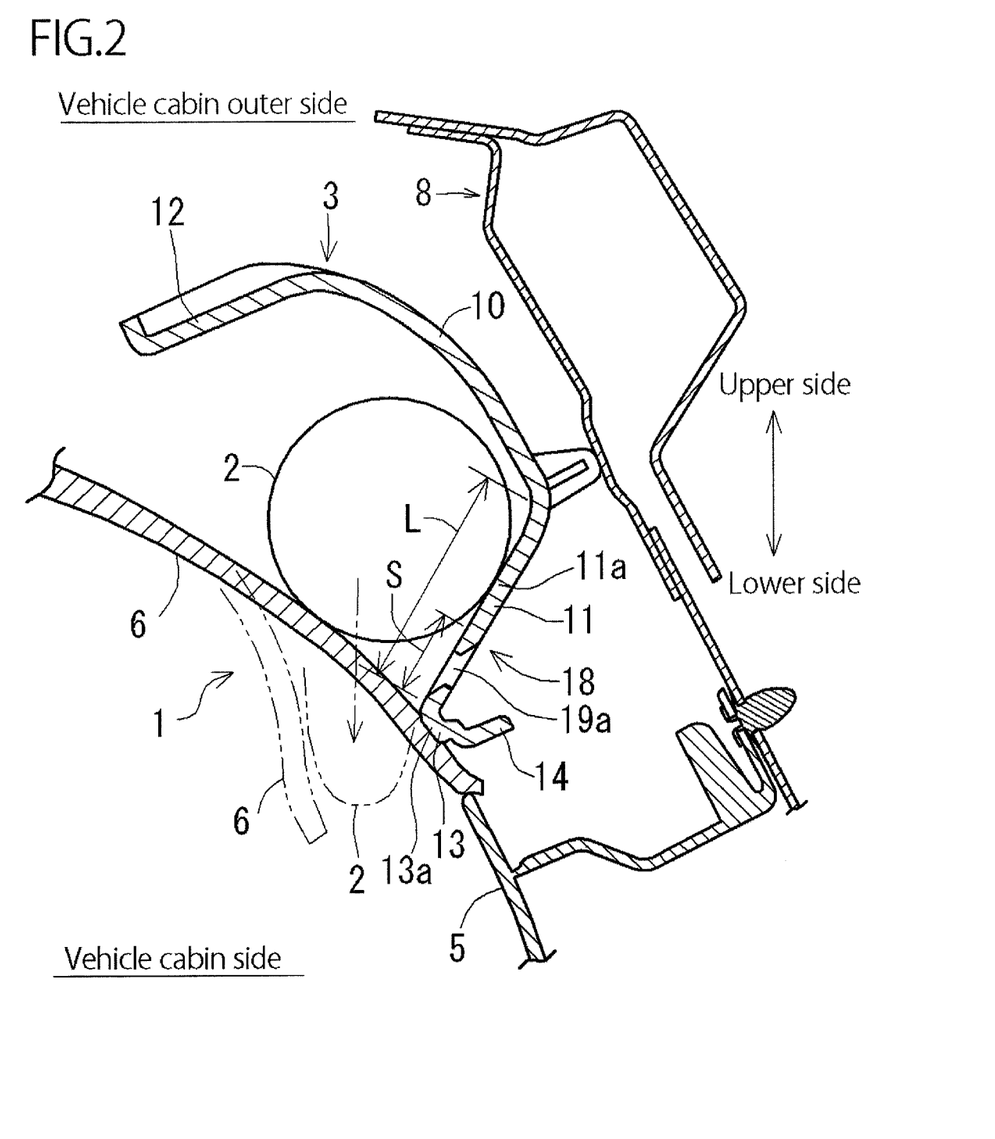
FIG. 2 is an enlarged sectional view taken along a line II-II in FIG. 1.

A head protection device in this embodiment is a head protection device (1) including an air bag (2) covered with a ceiling material (6) arranged above a pillar (5) of a vehicle, the air bag pressing the ceiling material from between the pillar and the ceiling material to open the ceiling material and expanding and inflating downward when an inflator is activated to flow a gas into the air bag, and a guiding bracket (3) covered with the ceiling material above the pillar, the guiding bracket guiding the air bag expanded and inflated by the inflator to a vehicle cabin side (Refer to, for example, FIG. 1 and FIG. 2). The guiding bracket (3) includes an attachment surface (10) that extends along a body panel (8) in the longitudinal direction of the vehicle and has an attachment portion (10a) attached to the body panel, a guiding wall (11) that extends from a lower end of the attachment surface toward a vehicle cabin side and has a support portion (11a) for supporting the air bag, and a contact portion (13) that is coupled to an end at the vehicle cabin side of the guiding wall and contacts the ceiling material (6). A weak portion (18) deformed toward a vehicle cabin outer side by a load of a passenger's head at a collision causing no activation of the inflator is formed between the support portion (11a) of the guiding wall (11) and the contact portion (13).

Figure 3:
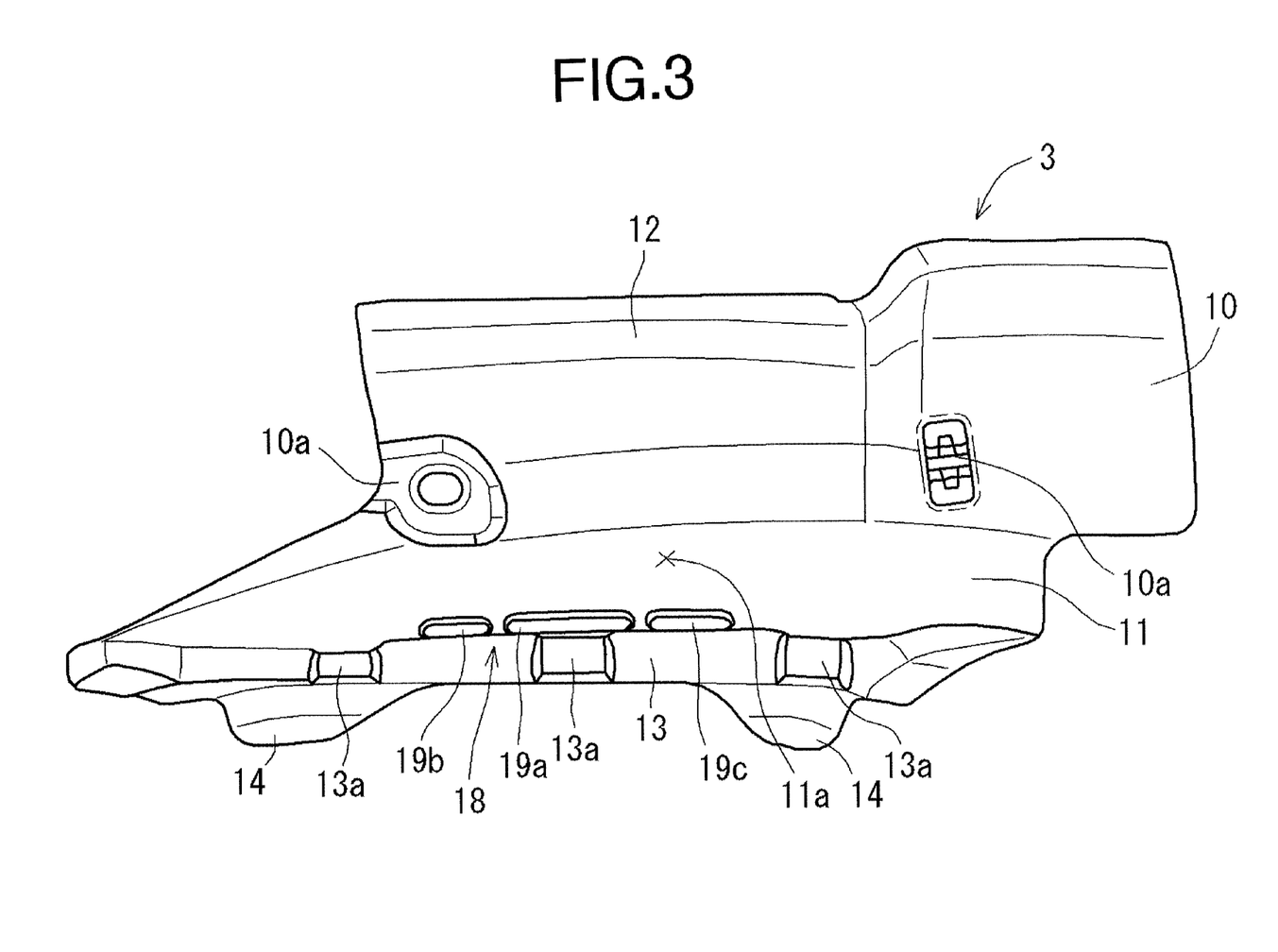
FIG. 3 is a front view of a guiding bracket according to the working example.

In the head protection device according to this embodiment, for example, the weak portion (18) may be formed near the contact portion (13) of the guiding wall (11) along the longitudinal direction of the vehicle (Refer to, for example, FIG. 2 and FIG. 3). In this case, for example, the weak portion (18) is formed in a predetermined length range (S) from the one end to which the contact portion (13) is coupled to the other end of the guiding wall (11) in the vertical section, and the predetermined length range (S) may be set to about 30% (preferably 20%) of a maximum length (L) of the guiding wall (Refer to, for example, FIG. 2).

Figure 4:
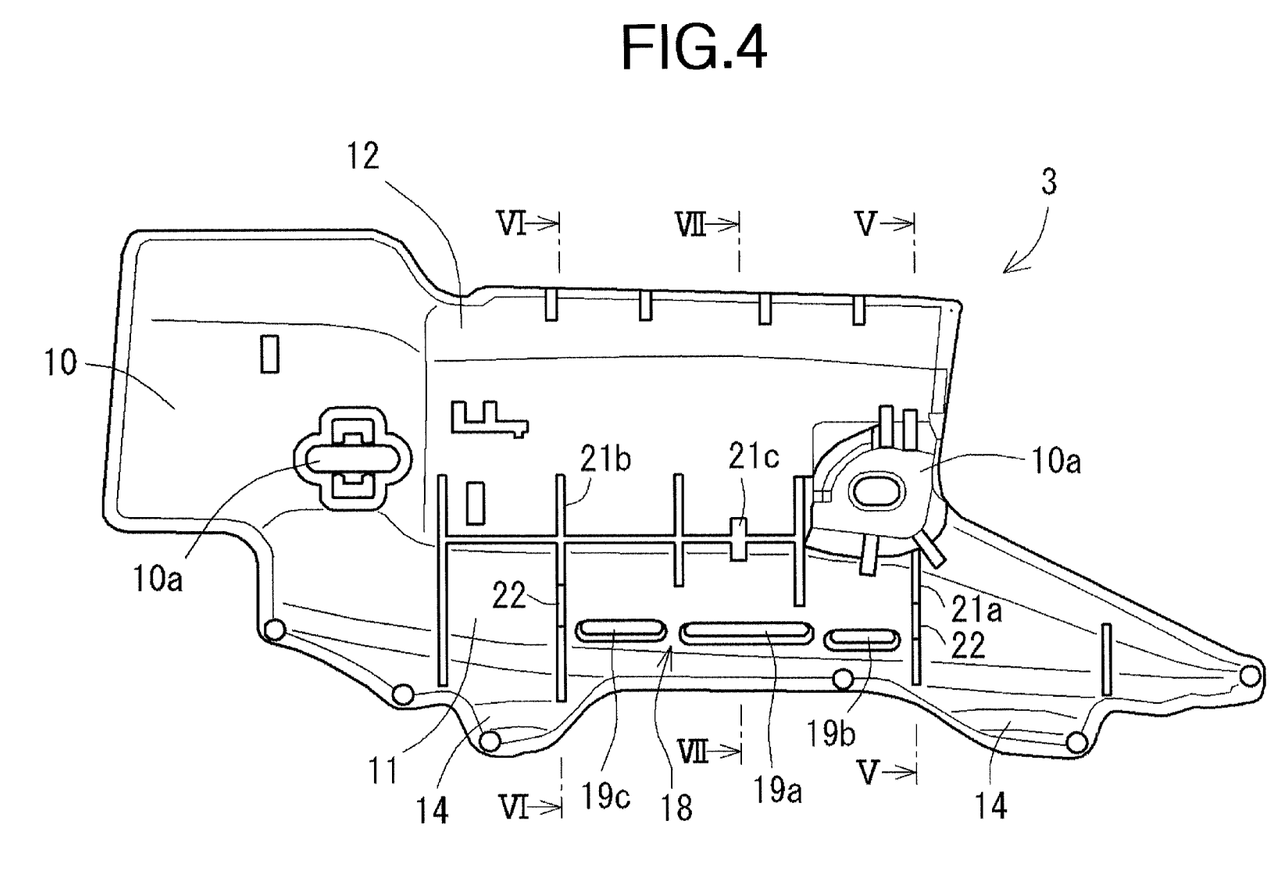
FIG. 4 is a back view of the guiding bracket.
Figure 8:
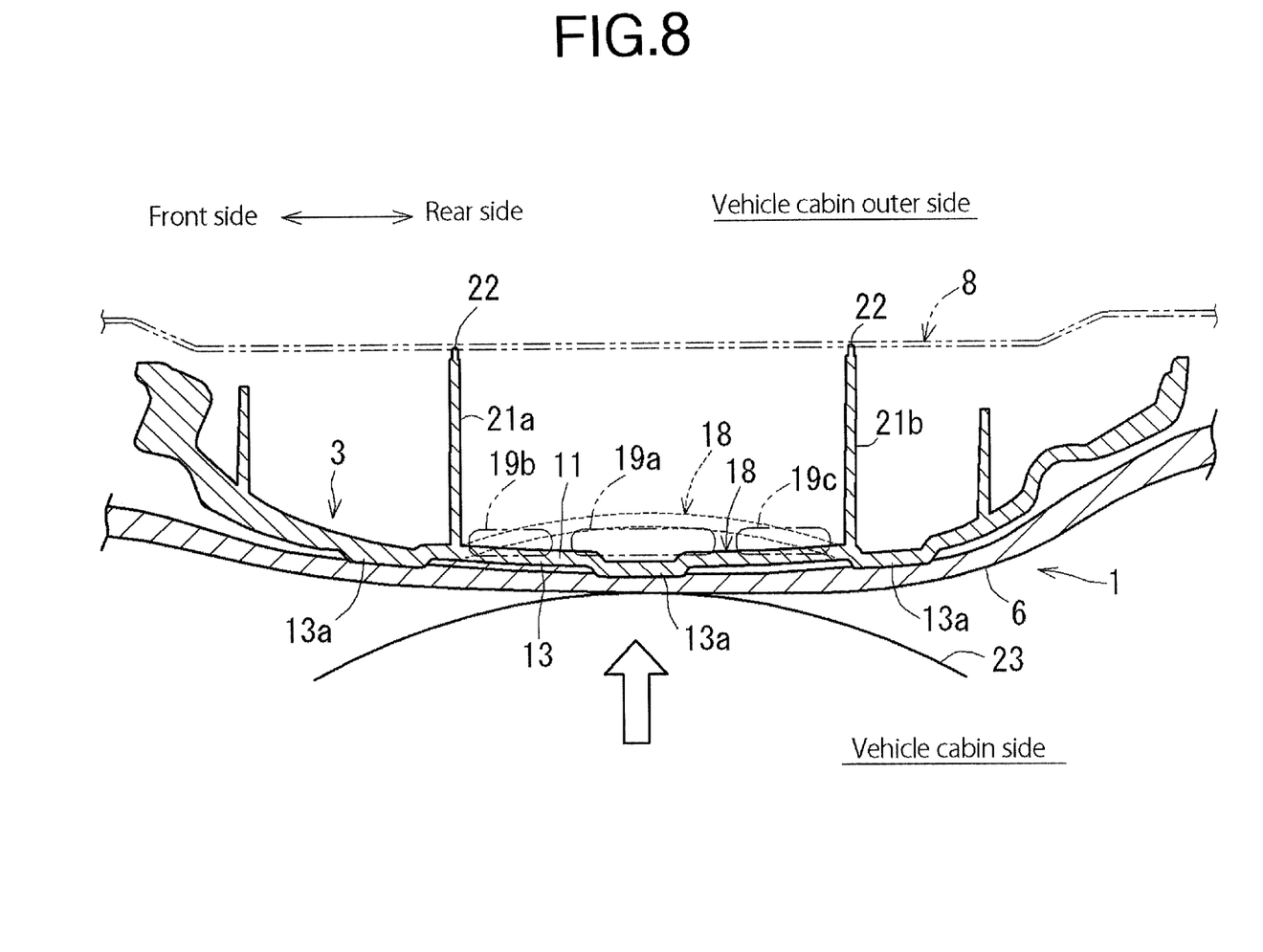
FIG. 8 is an explanatory view showing the action of the head protection device, and shows a cross section of the guiding bracket.

In the head protection device according to this embodiment, a back surface of the guiding wall (11) may have ribs (21a, 21b) in contact with the body panel (8) at respective ends of the weak portion (18) in the longitudinal direction of the vehicle (Refer to, for example, FIG. 4 and FIG. 8).

Figure 7:
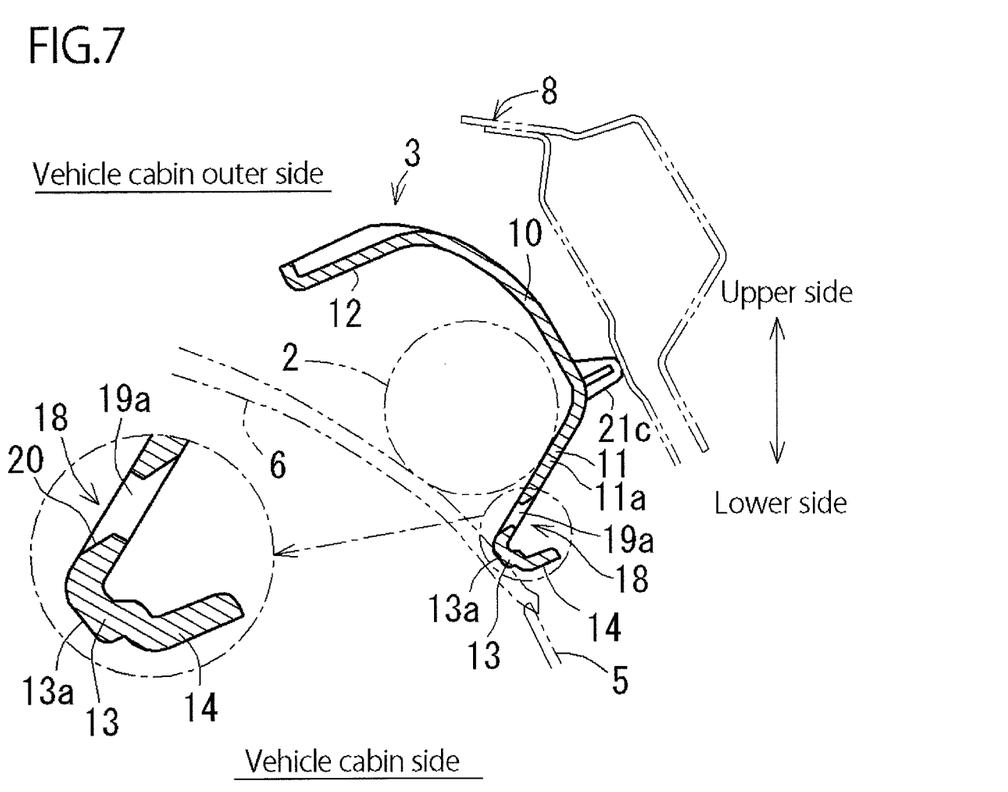
FIG. 7 is a sectional view taken along a line VII-VII in FIG. 4.

In the head protection device according to this embodiment, the weak portion (18) may be formed of a through hole (19a to 19c) provided along the longitudinal direction of the vehicle, and an edge of an upper surface of the through hole on the vehicle cabin side has an inclined surface (20) inclined toward the back surface of the guiding wall (11) (Refer to, for example, FIG. 7).

In the head protection device according to this embodiment, the guiding bracket (3) may include a folded portion (14) folded at the contact portion (13) toward the vehicle cabin outer side to form a free end (Refer to, for example, FIG. 2). This increases the rigidity of the guiding wall. In this case, for example, the ribs (21a, 21b) can be coupled to the folded portion (14) (Refer to, for example, FIG. 5 and FIG. 6). This further increases the rigidity of the guiding wall.

A guiding bracket in this embodiment is a guiding bracket (3) that is covered with a ceiling material (6) above a pillar (5) of a vehicle, and guides an air bag (2) expanded and inflated by an inflator to a vehicle cabin side (Refer to, for example, FIG. 1 and FIG. 2). The guiding bracket includes an attachment surface (10) having an attachment portion (10a) attached to a body panel, a guiding wall (11) that extends from a lower end of the attachment surface in a predetermined direction and has a support portion (11a) for supporting the air bag, and a contact portion (13) that is coupled to a front end of the guiding wall and contacts the ceiling material (6). A weak portion (18) deformed toward a vehicle cabin outer side by a load of a passenger's head at a collision causing no activation of the inflator is formed between the support portion (11a) of the guiding wall (11) and the contact portion (13).

The configuration described in this embodiment can be applied to the guiding bracket in the embodiment.

WORKING EXAMPLE

A working example of the present invention will be specifically described with reference to drawings.

As shown in FIG. 1 and FIG. 2, a head protection device 1 in this working example includes an air bag (also referred to as "curtain shield air bag") 2 and a guiding bracket 3. The airbag 2 is covered with an end of a ceiling material 6 arranged above a pillar 5 of a vehicle. Specifically, the air bag 2 is folded along a roof side 7 in a storage state. When an inflator (not shown) is activated to flow a gas into the air bag 2, the air bag 2 presses the ceiling material 6 from between the pillar 5 and the ceiling material 6 to open the ceiling material 6 to the vehicle cabin side, and expands and inflates downward (represented by a chain double-dashed line in FIG. 2). The guiding bracket 3 is covered with an end of the ceiling material 6 above the pillar 5. The guiding bracket 3 guides the airbag 2 expanded and inflated by the inflator to the vehicle cabin side. The air bag 2 is attached to a body panel 8 arranged in the vehicle cabin outer side of the ceiling material 6.

As shown in FIG. 3 and FIG. 4, the guiding bracket 3 is made of resin, and includes an attachment surface 10, a first guiding wall 11, a second guiding wall 12, a contact portion 13, and a folded portion 14.

Figure 5:
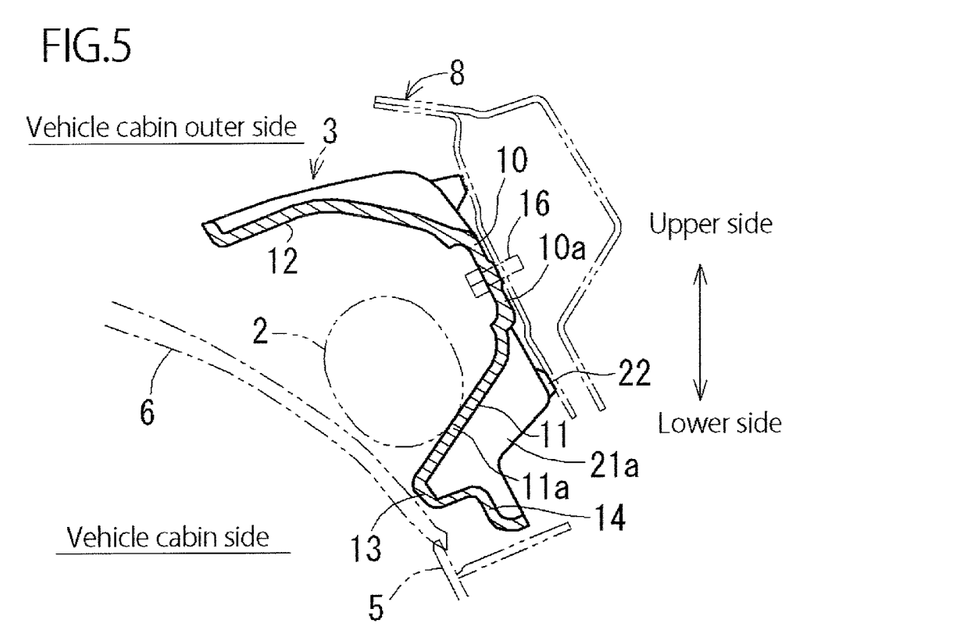
FIG. 5 is a sectional view taken along a line V-V in FIG. 4.
Figure 6:
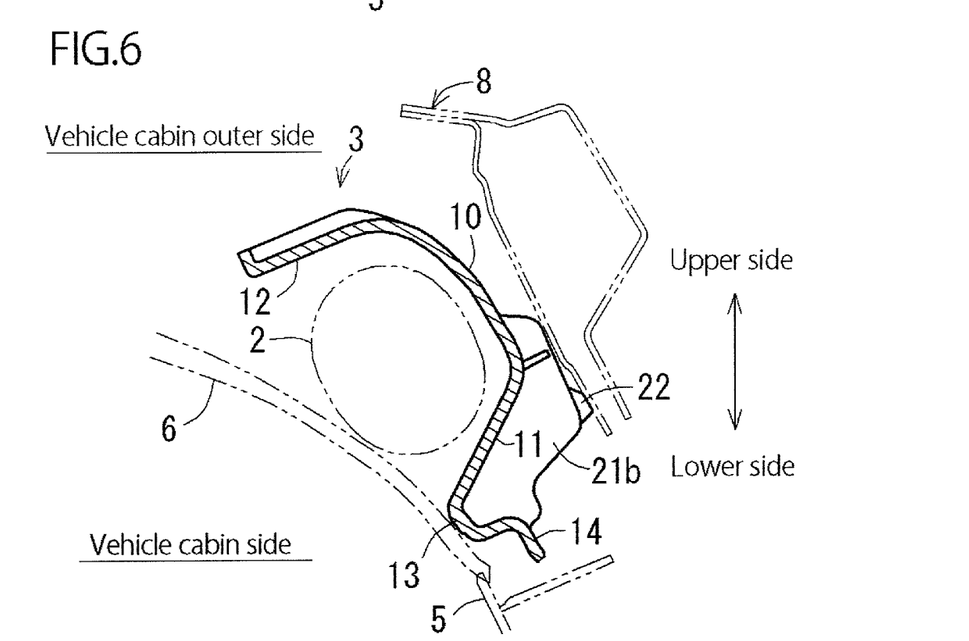
FIG. 6 is a sectional view taken along a line VI-VI in FIG. 4.

As shown in FIG. 5 to FIG. 7, the attachment surface 10 extends along the body panel 8 in the vehicle vertical direction. The attachment surface 10 has an attachment portion 10a attached to the body panel 8 with a bolt 16, a locking hook, or the like (Refer to FIG. 5). The first guiding wall 11 extends from a lower end of the attachment surface 10 toward the vehicle cabin side. The first guiding wall 11 has a support portion 11a for supporting the stored air bag 2 (Refer to FIG. 5 and FIG. 7). The second guiding wall 12 extends from an upper end of the attachment surface 10 toward the vehicle cabin side. The contact portion 13 is coupled to an end of the first guiding wall 11 in the vehicle cabin side. The contact portion 13 has a plurality of protrusions 13a that protrude toward the vehicle cabin side so as to contact the surface of the ceiling material 6 in the vehicle cabin outer side (Refer to FIG. 7 and FIG. 8). The folded portion 14 is folded at the contact portion 13 toward the vehicle cabin outer side to form a free end.

As shown in FIG. 7, a weak portion 18 deformed toward the vehicle cabin outer side by a load of a passenger's head at a collision causing no activation of the inflator (especially, at side collision) is formed between the support portion 11a of the first guiding wall 11 and the contact portion 13. The weak portion 18 is configured of a plurality (three in the figures) of through holes 19a, 19b, and 19c formed near the contact portion 13 with the first guiding wall 11 along the longitudinal direction of the vehicle (Refer to FIG. 3 and FIG. 4). Each of the through holes 19a to 19c is shaped like a long hole extending in the longitudinal direction of the vehicle. An edge of an upper surface of each of the through holes 19a to 19c on the vehicle cabin side has an inclined surface 20 inclined toward the back surface of the first guiding wall 11 (Refer to FIG. 7).

As shown in FIG. 4, the back surface of the first guiding wall 11 has ribs 21a and 21b extending in the vehicle vertical direction at respective ends of the weak portion 18 in the longitudinal direction of the vehicle. Each of the ribs 21a and 21b has a projection 22 in contact with the body panel 8 (Refer to FIG. 8). Each of the ribs 21a and 21b is coupled to the folded portion 14 (Refer to FIG. 5 and FIG. 6). The back surface of the first guiding wall 11 also has a rib 21c between the pair of ribs 21a and 21b in the longitudinal direction of the vehicle (Refer to FIG. 4). The rib 21c and the pair of ribs 21a and 21b contact the body panel 8 at different heights.

(2) Action of Head Protection Device

Next, action of the head protection device 1 with the above-mentioned configuration will be described. As represented by a chain double-dashed line in FIG. 2, when the air bag 2 is expanded by the inflator, the first guiding wall 11 of the guiding bracket 3 can guide the air bag 2 to the vehicle cabin side while bearing the load caused by expansion of the air bag 2. As a result, the expanded and inflated air bag 2 can be prevented from interfering with the pillar 5. In contrast, at a small collision causing no activation of the inflator, as shown in FIG. 8, when a passenger's head 23 collides with the guiding bracket 3 across the ceiling material 6, the weak portion 18 (that is, through holes 19a to 19c) is deformed toward the vehicle cabin side (represented by a broken line in FIG. 8), absorbing the load of the passenger's head 23.

(3) Effects of the Working Example

In the head protection device 1 according to this working example, the guiding bracket 3 includes the attachment surface 10 that extends along the body panel 8 in the vehicle vertical direction and has the attachment portion 10a attached to the body panel 8, the first guiding wall 11 that extends from the lower end of the attachment surface 10 toward the vehicle cabin side and has the support portion 11a for supporting the air bag 2, and the contact portion 13 that is coupled to the end of the first guiding wall 11 in the vehicle cabin side and contacts the ceiling material 6. The weak portion 18 deformed toward the vehicle cabin outer side by the load of the passenger's head at a collision causing no activation of the inflator is formed between the support portion 11a of the first guiding wall 11 and the contact portion 13. Thus, the first guiding wall 11 can smoothly guide the air bag 2 to the vehicle cabin side at expansion of the air bag 2 while bearing the load caused by expansion of the air bag 2. At a small collision causing no activation of the inflator, the weak portion 18 is deformed toward the vehicle cabin outer side by the load from the vehicle cabin side, absorbing the load of the passenger's head.

In the conventional head protection device 101, a ceiling design surface is partially lowered to ensure a shock absorbing property. In contrast, in the head protection device 1 according to this working example, the guiding bracket 3 performs a sufficient shock absorbing property, a large space inside the vehicle can be ensured without lowering the ceiling design surface.

In this working example, since the weak portion 18 is formed near the contact portion 13 of the first guiding wall 11 along the longitudinal direction of the vehicle, a distance between the weak portion 18 and the stored air bag 2 supported by the support portion 11a becomes large, further suppressing the effect of the air bag 2 on the weak portion 18 at expansion of the air bag 2. Further, the weak portion 18 can absorb the load more reliably.

In this working example, since the back surface of the first guiding wall 11 has the ribs 21a and 21b in contact with the body panel 8 at respective ends of the weak portion 18 in the longitudinal direction of the vehicle, at expansion of the air bag 2, the first guiding wall 11 is supported at the body panel 8 by the ribs 21a and 21b, and at a small collision causing no activation of the inflator, the weak portion 18 is deformed using the ribs 21a and 21b as bases.

In this working example, since the weak portion 18 is formed of the through holes 19a to 19c provided along the longitudinal direction of the vehicle, and the edge of the upper surface of each of the through holes 19a to 19c on the vehicle cabin side has the inclined surface 20 inclined toward the back surface of the first guiding wall 11, it is prevented that, at expansion of the air bag 2, the air bag 2 caught with the through holes 19a to 19c, and also prevented that the air bag 2 is inhibited from expanding. Further, the weak portion 18 can absorb the load more reliably.

In this working example, since the guiding bracket 3 has the folded portion 14 folded at the contact portion 13 toward the vehicle cabin outer side to form the free end, the rigidity of the first guiding wall 11 is increased. Especially, in this working example, since the ribs 21a and 21b are coupled to the folded portion 14, the rigidity of the first guiding wall 11 is further increased.

The present invention is not limited to the working example, and may be variously modified within the scope of the present invention according to objects and applications. That is, in the working example, the weak portion 18 formed of the through holes 19a to 19c is exemplified. However, the present invention is not limited to this, and for example, a weak portion formed of a thin portion may be adopted. Alternatively, a combination of the through holes and the thin portion may be adopted as the weak portion.

In the working example, the weak portion 18 formed of the three through holes 19a to 19c provided along the longitudinal direction of the vehicle is exemplified. However, the present invention is not limited to this, and for example, a weak portion formed of one, two, or four or more through holes provided along the longitudinal direction of the vehicle may be adopted.

In the working example, the long through hole is exemplified. However, the present invention is not limited to this, and for example, through hole of round, square, or other shape may be adopted.

In the working example, the guiding bracket 3 is arranged above the center pillar 5. However, the present invention is not limited to this, and for example, the guiding bracket may be arranged above a front pillar or a rear pillar.

The present invention is widely applied as a technique of protecting a head in passenger cars, buses, and trucks; rail cars such as trains and steam trains; construction vehicles; agricultural vehicles; and industrial vehicles at collision.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A head protection device comprising:
an air bag covered with a ceiling material arranged above a pillar of a vehicle, the air bag pressing against the ceiling material to open the ceiling material, and when an inflator is activated to flow a gas into the air bag, the air bag expands and inflates downward against the ceiling material toward a vehicle cabin side from between the pillar and the ceiling material; and
a guiding bracket covered with the ceiling material above the pillar, the guiding bracket guiding the air bag expanded and inflated by the inflator to the vehicle cabin side,
wherein the guiding bracket includes:
an attachment surface extending along a body panel in a vehicle vertical direction, and the attachment surface having an attachment portion attached to the body panel;
a guiding wall extending from a lower end of the attachment surface toward the vehicle cabin side, the guiding wall having a support portion for supporting the air bag; and
a contact portion provided at an end of the guiding wall and contacting the ceiling material, and
a weak portion, deformable toward a vehicle cabin outer side by a load of a passenger's head at a collision thereby causing no activation of the inflator, is provided between the support portion of the guiding wall and the contact portion, and is defined as a through hole in the guiding wall provided along a longitudinal direction of the vehicle, wherein
a side wall of the guiding wall defining a lower portion of the through hole on the vehicle cabin side has an inclined surface inclined toward a back surface of the guiding wall.

2. The head protection device according to claim 1, wherein the weak portion is provided near the contact portion provided at the end of the guiding wall along the longitudinal direction of the vehicle.

3. The head protection device according to claim 1, wherein a back surface of the guiding wall has ribs in contact with the body panel at respective ends of the weak portion in the longitudinal direction of the vehicle.

4. The head protection device according to claim 1, the guiding bracket further comprising:
a folded portion projecting away from the ceiling material, wherein
the attachment surface, the guiding wall and the weak portion extend toward the contact portion, and the folded portion extends from the contact portion to a vehicle cabin outer side at a free end thereof.

5. A guiding bracket that is covered with a ceiling material above a pillar of a vehicle, and guides an air bag expanded and inflated by an inflator to a vehicle cabin side, the guiding bracket comprising:
an attachment surface having an attachment portion attached to a body panel;
a guiding wall extending from a lower end of the attachment surface in a predetermined direction, the guiding wall having a support portion for supporting the air bag; and
a contact portion coupled to a front end of the guiding wall, the contact portion contacting the ceiling material, wherein
a weak portion, deformable toward a vehicle cabin outer side by a load of a passenger's head at a collision thereby causing no activation of the inflator, is provided between the support portion of the guiding wall and the contact portion, and is defined as a through hole in the guiding wall provided along a longitudinal direction of the vehicle, and a side wall of the guiding wall defining a lower portion of the through hole on the vehicle cabin side has an inclined surface inclined toward a back surface of the guiding wall.

6. The guiding bracket according to claim 5, the guiding bracket further comprising:

a folded portion projecting away from the ceiling material, wherein the attachment surface, the guiding wall and the weak portion extend toward the contact portion, and the folded portion extends from the contact portion to a vehicle cabin outer side at a free end thereof.

* * * * *